(12) United States Patent
Toda et al.

(10) Patent No.: US 7,408,659 B2
(45) Date of Patent: Aug. 5, 2008

(54) SERVER COMPUTER, INFORMATION TERMINAL, PRINTING SYSTEM, REMOTE PRINTING METHOD, RECORDING MEDIUM, AND COMPUTER DATA SIGNAL EMBEDED IN A CARRIER WAVE

(75) Inventors: Naohiro Toda, Numazu (JP); Takashi Rokutanzono, Tachikawa (JP); Shinji Nousyo, Numazu (JP); Tatsuya Niimi, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 737 days.

(21) Appl. No.: 10/184,904

(22) Filed: Jul. 1, 2002

(65) Prior Publication Data

US 2003/0002078 A1    Jan. 2, 2003

(30) Foreign Application Priority Data

Jul. 2, 2001    (JP)    ............................. 2001-200473

(51) Int. Cl.
*G06K 15/00* (2006.01)
*G06F 3/12* (2006.01)
(52) U.S. Cl. ..................... 358/1.15; 355/1.16

(58) Field of Classification Search ................ 358/1.15, 358/1.16; 710/65, 3, 4; 370/316; 701/200, 701/201, 202, 207, 208, 213; 705/6
See application file for complete search history.

(56) References Cited

U.S. PATENT DOCUMENTS

| | | | | |
|---|---|---|---|---|
| 5,898,680 | A * | 4/1999 | Johnstone et al. | 370/316 |
| 6,707,570 | B1 * | 3/2004 | Gotanda et al. | 358/1.15 |
| 2001/0029459 | A1 * | 10/2001 | Fujiwara | 705/6 |
| 2002/0019894 | A1 * | 2/2002 | Aoki et al. | 710/65 |
| 2002/0051178 | A1 * | 5/2002 | Nakayasu et al. | 358/1.15 |
| 2003/0035133 | A1 * | 2/2003 | Berkema et al. | 358/1.15 |

FOREIGN PATENT DOCUMENTS

JP    11-146118    5/1999

* cited by examiner

*Primary Examiner*—Gabriel I. Garcia
(74) *Attorney, Agent, or Firm*—Morrison & Foerster LLP

(57) ABSTRACT

A server computer searches for at least one printing-service providing store based on printing-condition information sent form an information terminal, and sends information representing the searched printing-service providing store to the information terminal. After a user selects one printer device based on the information representing the at least one printing-service providing store, the information terminal sends document data to be printed to the server computer. The server computer sends printing data to be printed to the user-selected printer device.

13 Claims, 8 Drawing Sheets

| No. | LOCATION INFORMATION | ADDRESS | ADDITION INFORMATION | IMAGE |
|---|---|---|---|---|
| 1 | ABC CONVENIENCE STORE | 99 BLUE STREET NY CITY | | |
| 2 | XYZ CONVENIENCE STORE | 4 PURPLE STREET SEATTLE | | |
| | | | | |

| | PLACE OF DEPARTURE | DESTINATION | MEANS OF TRANSPORTATION |
|---|---|---|---|
| ① | 2222 HORSE AVE., SALT-LAKE CITY | 3333 DOG DR., SALT-LAKE CITY | BY FOOT ▶ |
| ② | 4444 DOG DR., SALT-LAKE CITY | 5555 CAT AVE. SAN FRANCISCO | BY AIR ▶ |
| ③ | 5555 TIGER ST. LOS ANGELES | 6666 MONKEY AVE. LOS ANGELES | BY FOOT ▶ |

☐ DISPLAY MANY STORES
☐ PREFER STORE ALONG HIGHWAY
☐ 24-HOUR OPEN
☐ COLOR PRINTER

PREFERRED DIRECTION IN WHICH STORE IS LOCATED    LEFT-HAND SIDE ▶

PARKING LOT    YES ▶

NAME [        ]    E-MAIL [        ]

PHONE NO. [        ]    ID [        ]

SEARCH — B

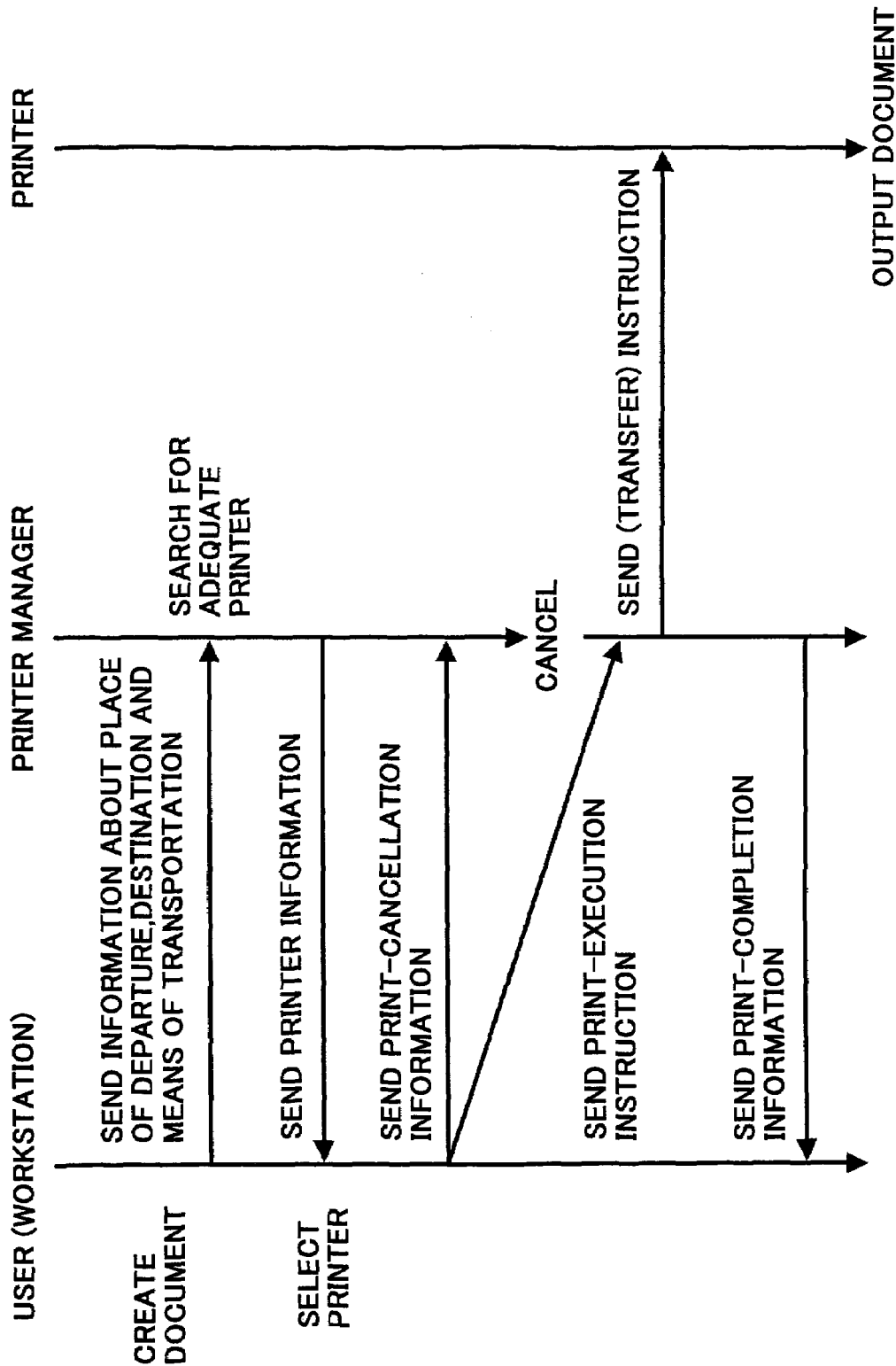

SERVER COMPUTER, INFORMATION TERMINAL, PRINTING SYSTEM, REMOTE PRINTING METHOD, RECORDING MEDIUM, AND COMPUTER DATA SIGNAL EMBEDED IN A CARRIER WAVE

BACKGROUND OF THE INVENTION

1. Field of the Invention

The present invention relates to a printing system providing a service for printing documents in a place a user has visited.

2. Description of the Related Art

In recent years, as the processing speed of CPU (Central Processing Unit) has enhanced, personal computers essentially including the CPU have widely been used. In such context, printers which output printing data created by the personal computers have spread.

For example, before a business user is going to a meeting which will remotely be held, the user prepares some documents by operating a printer, connected to a personal computer in office, in accordance with a general printing method. Then, the user brings the output documents to the place he/she is going.

However, according to such a printing method, if the user needs to bring a large number of documents to a remote place, it would be too much work for the user to bring the documents.

In order to overcome such a problem, various methods have been proposed. For example, according to one method, to-be-printed data including the documents created by the personal computer is stored on a recording medium, such as a CD, etc. The user brings this recording medium to a printing shop located near the destination, and prints the stored documents at the printing shop. Otherwise, the user may send the to-be-printed data including the documents to the printing shop through a network in advance.

Recently, a printing service with the utilization of a network has rapidly spread. For example, Unexamined Japanese Patent Application KOKAI Publication No. 11-146118 proposes a printing service. According to this printing service, the to-be-printed data of the user portable terminal is registered in a server through a network, and the user goes to a communicable printer of the remote place. Then, the to-be-printed data is read out from the server, and the read data can be printed by the printer, while charging the user for this service.

Further, there is a service for displaying a neighbor map of the destination through a network upon inputting of destination information. According to this service, the user can find out the nearest printing shop from the destination.

However, according to a method of printing documents stored on a recording medium in the printing shop, it is necessary to open the documents that have been created using a specific application. Hence, a personal computer needs to be installed in the printing shop. In the case where the printing shop does not have the application for opening printing data of the documents, the documents can not be printed.

Furthermore, according to the method disclosed in Unexamined Japanese Patent Application KOKAI Publication No. H11-146118, the nearest printing shop from the destination can be searched out. However, the searched printing shop may be located far from the user's route to the destination. In this case, the user may need to take the long way to the destination, only for using the searched printing shop.

The entire contents of Unexamined Japanese Patent Application KOKAI Publication No. H11-146118 are hereby incorporated by reference in its entirely.

SUMMARY OF THE INVENTION

The present invention has been made in consideration of the above, and it is accordingly an object of the present invention to provide a system for and method of outputting documents using a printer device installed in a store which is conveniently located with respect to a route to a destination.

In order to attain the above object, according to the first aspect of the present invention, there is provided a server computer which is connectable to at least one information terminal and a plurality of printer devices through a communications network, the computer comprising:

a database which stores location information regarding a location in which each of the plurality of printer devices is installed;

a condition-information receiver which receives printing-condition information including route information regarding a user's route to a destination, from the at least one information terminal;

a search unit which searches the database, and extracts the location information regarding a location of one or more printer devices included in the plurality of printer devices from the database, based on the received printing-condition information;

a location-information sender which sends the location information regarding the location of the one or more printer devices, to the at least one information terminal;

a document-data receiver which receives printer information regarding a user-selected printer device, that a user has selected from the one or more printer devices based on the location information, and document data to be printed; and a document-data sender which sends the document data to the user-selected printer device.

According to this invention, it is not necessary to bring documents to a remote place that a user is going to visit. The system can search for a store that is conveniently located with respect to a route to a destination, and can output documents using the printer device installed in the searched store. By setting various conditions during the searching, a result of the searching can flexibly be obtained. In the case where a sales staff is visiting his/her customer by air, the sales staff may want to get the documents necessary for a business before boarding an airplane and check the documents in the plane. In this case, the sales staff searches for a store located near or at the airport, transfers to-be-printed data to a printer device installed in the searched store, and outputs the transferred data from the printer device. In the case where the sales staff is staying in a hotel located close to the nearby airport on the night before the sales staff has a meeting with the customer, the sales searches for a store around the hotel, transfers to-be-printed data to a printer installed in the store, and can output the to-be-printed data from the printer device.

The printing-condition information may include departure information representing a place of departure, destination information representing the destination and transportation information representing means of transportation to be used by the user; and the search unit may search a map database, and extract the location information regarding the location of the one or more printer devices, based on some search keys including the departure information, the destination information and the transportation information.

According to this invention, in the case where the sales staff goes to a customer's company from his/her company to have a business with a customer, the sales staff sends location (position) information (information regarding the place of departure) of the staff's company, destination information regarding the customer's place and information regarding the means of transportation, to a server computer from an information terminal. By this, the sales staff can search a map database for the route to the destination in the case where the sales staff gets there by car, or for a store located along the route and having a printer installed therein. Hence, the sales staff can print documents necessary for a business at the searched store.

The printing-condition information may further include location-request information, regarding a preferred location for a printer device that the user prefers.

According to this invention, the user of this system can searches for a store located, for example, along a predetermined highway.

The location information may further include function information regarding a function of each of the plurality of printer devices; and the printing-condition information may further include function-request information regarding a preferred function for a printer device that the user prefers.

According to this invention, the user can search for a store having a color printer installed therein, for example.

The server computer may further comprise a monitor which acquires status information representing status of the user-selected printer device to which the document data has been sent, and carries out a predetermined error process in a case where an error occurs in the user-selected printer device.

According to this invention, in a case where an error occurs, it is possible to immediately deal with the error.

The server computer may further comprise:

an advertisement-data storage unit which stores advertisement data regarding the location information of each of the plurality of printer devices; and an advertisement-data reader which reads out the advertisement data corresponding to the user-selected printer device from the advertisement-data storage unit, and wherein the document-data sender affixes the read advertisement data to the document data, and sends the document data having the advertisement data affixed thereto to the user-selected printer device.

For example, let it be assumed a case wherein a lecturer is going to give a lecture to a large number of people and prepares lecture notes for the people using a printer device installed in a store located near the university. In this case, the name of the store is written in the header section of the printed documents, as advertisement data. Hence, the store can advertise itself to the lecture listeners. In this manner, if the lecturer puts the store advertisement on the printed documents and hands out the documents to the lecture listeners, the store gives some kind of service to the lecturer for the ad.

In order to attain the above object, according to the second aspect of the present invention, there is provided an information terminal which is connectable to a server computer, having a database storing location information regarding a location of each of a plurality of printer devices, through a communications network, the terminal comprising:

a printing-condition information input unit which accepts printing-condition information including route information regarding a user's route to a destination;

a data sender which sends the printing-condition information to the server computer;

a data receiver which receives location information regarding a location of one or more printer devices, the location information being extracted from the database based on the sent printing-condition information;

a printer-selection accepting unit which outputs the received location information, and accepts selection information representing a user-selected printer device that a user has selected from the one or more printer device; and a sender which sends printer information representing the user-selected printer device and document data to be printed, to the server computer.

The printing-condition information may include departure information representing a place of departure, destination information representing a user's destination and transportation information representing means of transportation to be used by the user.

In order to attain the above object, according to the third aspect of the present invention, there is provided a printing system including a server computer and a plurality of printer devices which are all connectable to each other through a communications network, and wherein the server computer:
stores location information regarding a location of each of the plurality of printer devices, in a database;
receives printing-condition information including route information regarding a user's route to a destination, from at least one information terminal;
searches the database, and extracts location information regarding a location of one or more printer devices, based on the received printing-condition information;
sends the extracted location information to the at least one information terminal;
receives printer information representing a user-selected printer device, that a user has selected from the one or more printer devices, and document data to be printed, from the at least one information terminal; and
sends the document data to the user-selected printer device, and the user-selected printer device receives the document data from the server computer, and prints the received document data.

The user-selected printer device may acquire advertisement data regarding a location thereof, and prints the advertisement data in a header section or a footer section of the document data received from the server computer.

The printing-condition information may include departure information representing a place of departure, destination information representing a user's destination, and transportation information representing means of transportation to be used by the user; and the server computer may search a map database, and extracts the location information regarding the location of the one or more printer devices, based on some search keys including the departure information, the destination information and the transportation information.

The server computer may acquire status information representing status of the user-selected printer device to which the document data has been sent, and carry out a predetermined error process in a case where an error occurs in the user-selected printer device.

In order to attain the above object, according to the fourth aspect of the present invention, there is provided a method of remotely printing predetermined data to be printed, comprising the steps of:

sending printing-condition information including route information, regarding a user's route to a destination, to the server computer;

searching a database, and extracts location information regarding a location of one or more printer devices included in the plurality of printer devices from the database, based on the printing-condition information;

sending the extracted location information to a user terminal;

outputting the location information regarding the location of the one or more printer devices, in the user terminal, and accepting document data to be printed and selection information representing a user-selected printer device, that a user has selected from the one or more printer devices specified in the location information;

sending printer information regarding the user-selected printer device and document data to be printed to the server computer; and sending the document data to the user-selected printer device selected by the user in the server computer.

A part or all of the plurality of printer devices may be installed in convenience stores, respectively.

According to this invention, the user can use a convenience store having a long period of business hours a day (e.g. opens twenty four hours a day), to output necessary documents. Even if there will be held an urgent meeting, the user can prepare necessary documents using a printer device of the convenience store.

In order to attain the above object, according to the fifth aspect of the present invention, there is provided a method of remotely printing predetermined data to be printed, comprising the steps of:

acquiring printing-condition information including route information, regarding a user's route to a destination;

searching a database, and extracts location information regarding a location of one or more printer devices included in the plurality of printer devices from the database, based on the printing-condition information;

supplying a user with the extracted location information;

accepting selection information representing a user-selected printer device, that the user has selected from the one or more printer devices specified in the supplied location information;

acquiring printer information regarding the user-selected printer device and document data to be printed; and sending the document data to the user-selected printer device selected by the user.

In order to attain the above object, according to the sixth aspect of the present invention, there is provided a computer readable recording medium which records a program for controlling a server computer, which is connectable to at least one information terminal and a plurality of printer devices through a communications network, to serve as:

a condition-information receiver which receives printing-condition information including route information regarding a user's route to a destination, from the at least one information terminal;

a search unit which searches a database storing location information regarding an installation location of each of the plurality of printer devices, and extracts the location information regarding a location of one or more printer devices included in the plurality of printer devices from the database, based on the received printing-condition information;

a location-information sender which sends the location information regarding the location of the one or more printer devices, to the at least one information terminal;

a document-data receiver which receives printer information regarding a user-selected printer device, that a user has selected from the one or more printer devices based on the location information, and document data to be printed; and a document-data sender which sends the document data to the user-selected printer device.

In order to attain the above object, according to the seventh aspect of the present invention, there is provided a computer data signal embodied in a carrier wave and representing a program for controlling a server computer, which is connectable to at least one information terminal and a plurality of printer devices through a communications network, to serve as:

a condition-information receiver which receives printing-condition information including route information regarding a user's route to a destination, from the at least one information terminal;

a search unit which searches a database storing location information regarding an installation location of each of the plurality of printer devices, and extracts the location information regarding a location of one or more printer devices included in the plurality of printer devices from the database, based on the received printing-condition information;

a location-information sender which sends the location information regarding the location of the one or more printer devices, to the at least one information terminal;

a document-data receiver which receives printer information regarding a user-selected printer device, that a user has selected from the one or more printer devices based on the location information, and document data to be printed; and a document-data sender which sends the document data to the user-selected printer device.

BRIEF DESCRIPTION OF THE DRAWINGS

The object and other objects and advantages of the present invention will become more apparent upon reading of the following detailed description and the accompanying drawings in which:

FIG. 6 is a diagram exemplarily showing a display page displayed on the workstation of FIG. 3;

FIG. 7 is a diagram for explaining a print process carried out by the printing system of FIG. 1;

DETAILED DESCRIPTION OF THE PREFERRED EMBODIMENT

A printing system according to a preferred embodiment of the present invention will now be explained with reference to the accompanying drawings.

Schematically, the printing system of this embodiment searches for a printing-service providing store, such as a convenience store or the like, and informs a user of the searched store, based on information representing the route to the user-specified destination or the means of transportation. Hence, the user can acquire some output paper using a printer of a printing-service providing store that the user prefers.

Figure 1:
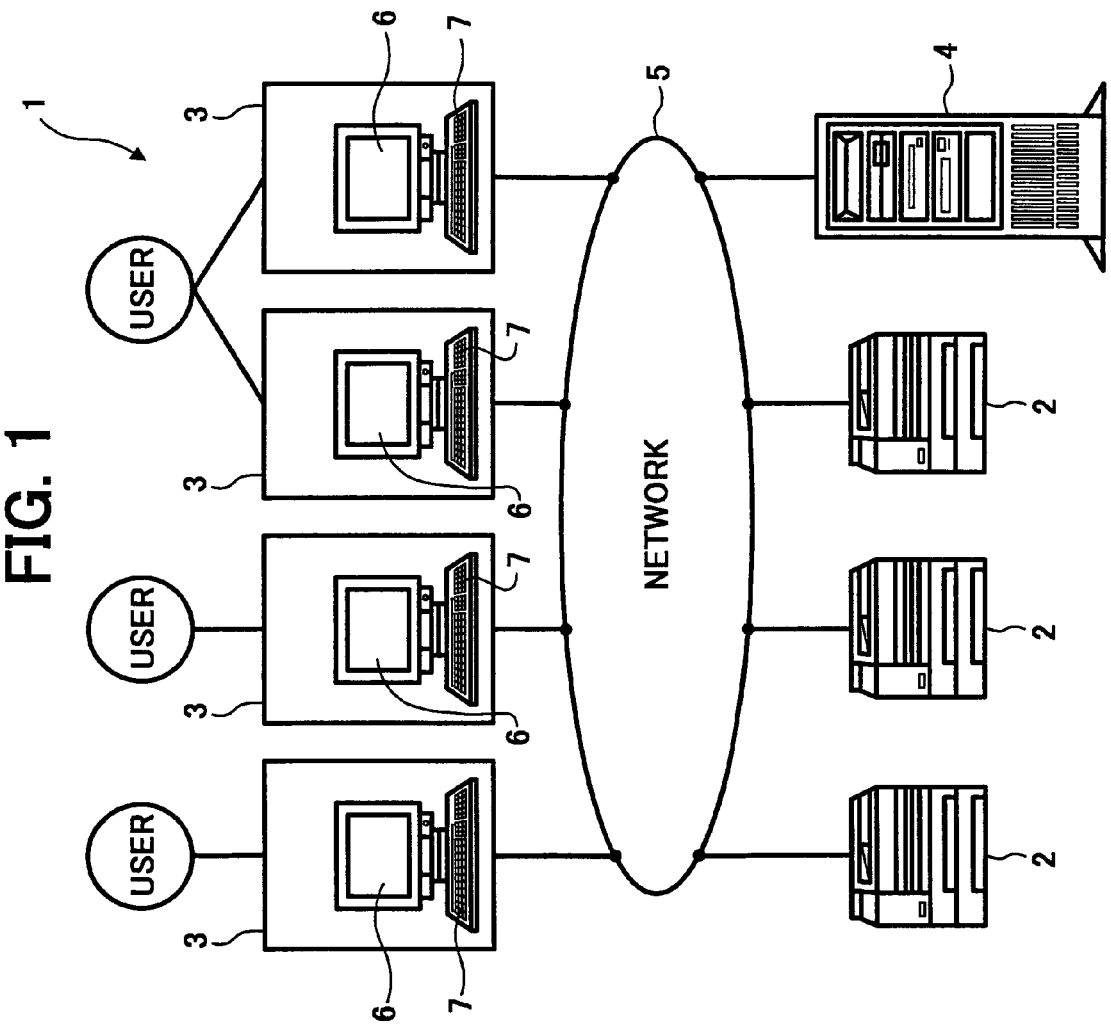
FIG. 1 is a schematic diagram showing a printing system according to an embodiment of the present invention.

FIG. 1 is a block diagram schematically showing the entire structure of the printing system 1 according to this embodiment. As shown in FIG. 1, the printing system 1 comprises a plurality of printer devices 2, a plurality of workstations 3 each serving as an information terminal which can execute various data processing, and a printer manager 4 serving as a server computer. In this structure of the printing system 1, the plurality of printer devices 2, the plurality of workstations 3 and the printer manager 4 are connected with each other through a communications network 5.

Figure 2:
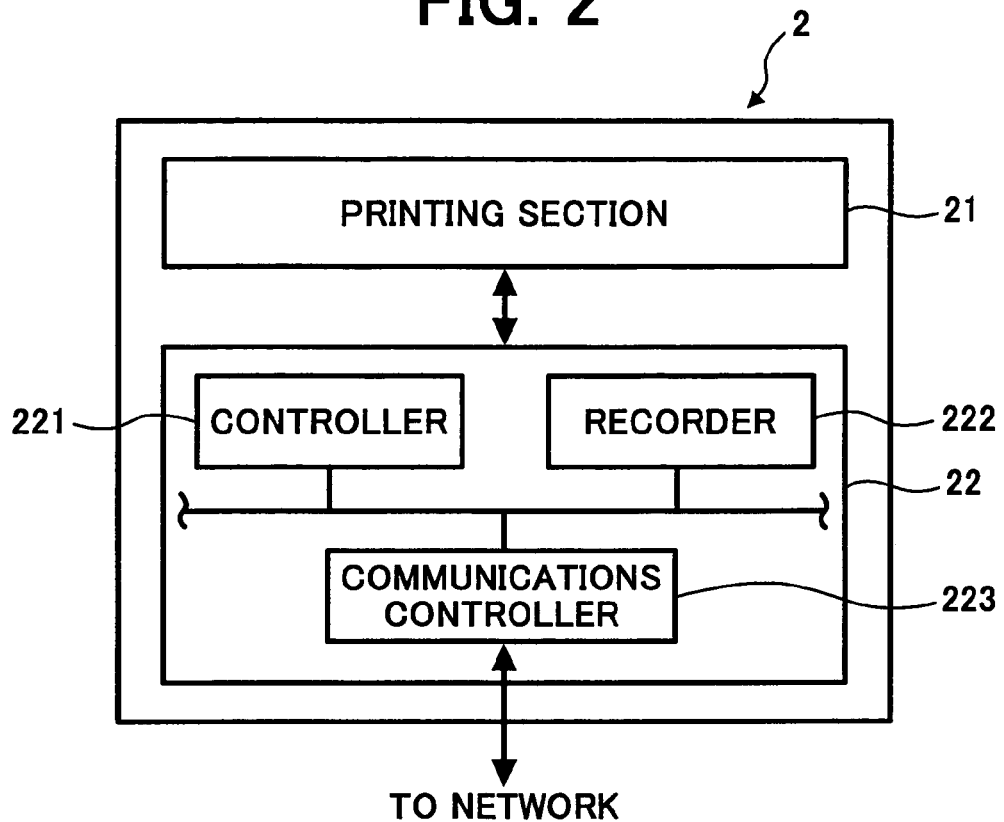
FIG. 2 is a diagram exemplarily showing the structure of a printer device included in the printing system of FIG. 1.

Each of the printer devices 2 is an image creator which creates images on a paper, based on image data. As illustrated in FIG. 2, each of the printer devices 2 includes a printing section 21 and a printing controller 22. The printing section 21 prints images under the control of the printing controller 22. The printing controller 22 includes a computer having a controller 221, a recorder 222 and a communications controller 223, etc.

The printer 2 can employ any of various printing systems, such as an electrophotographic processing system, an ink-jet system, a sublimation thermal transfer processing system, a silver photographic processing system, a direct thermal recording system, a melting-type thermal transfer processing system. Because the specific structure and operations of the above printing systems are well known, the detailed explanation thereof will now be made in this specification. Recently, as multi-function digital machines, many copiers have not only a copier function, but also a printer function, facsimile function, etc. In such copiers, the image quality has remarkably been improved. In the above circumstances, the printer devices 2 may be realized on the copiers.

It is preferred that such printer devices 2 be popularly installed. In this case, it is possible to use, as the printer devices 2, copiers which are installed commonly in convenience stores or photo stores that mainly develop and print for silver photography. Particularly, those printer devices 2, which are installed in convenience stores that are open twenty-four hours a day or are open until late at night, are useful, if the user urgently needs some document. This may increase in the operational time of the copiers, the convenience stores or photo stores may expect the increased profitability and an increased number of customers.

Figure 3:
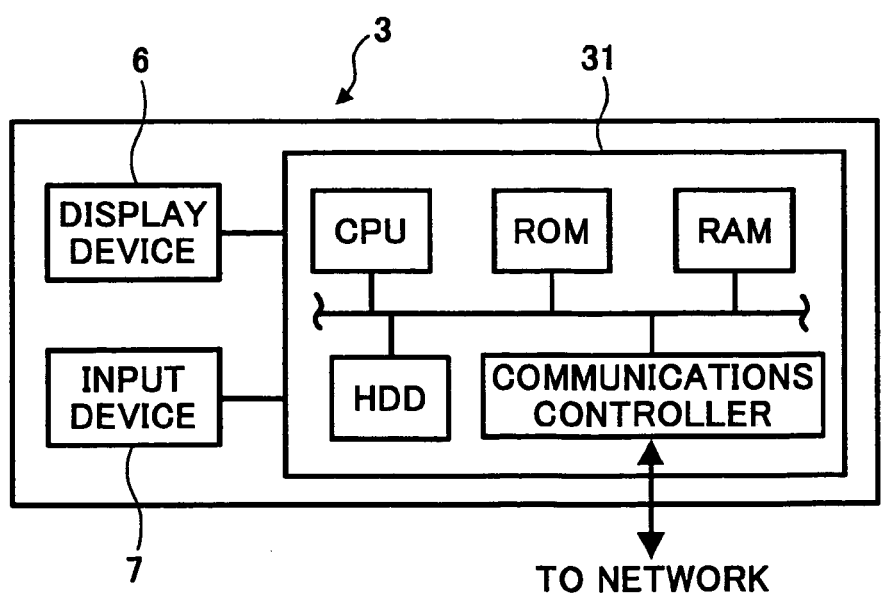
FIG. 3 is a diagram exemplarily showing the structure of a workstation included in the printing system of FIG. 1.

Each of the workstations 3 includes, as shown in FIG. 3, a controller 31 including a CPU (Central Processing Unit), a ROM (Read Only Memory), a RAM (Random Access Memory), an HDD (Hard Disk Drive), a communications controller, etc., a display device 6 controlled by this controller 31 and an input device 7, such as a keyboard, a mouse, etc. Such a workstation 3 may be shared among more than one user. On the other hand, one user may use the plurality of workstations 3. The user is a person who operates the workstation 3, and creates a document with the workstation 3. The user sends various information (printing-condition information) including: departure information; destination where the user intends to use the created document; the means of transportation; and also user information, to the printer manager 4. In the case where the user often sends the above-described printing-condition information, if the user once registers the information into the printer manager 4 in association with his/her ID number, the user can be succeeded in sending the information simply by inputting the ID number afterwards.

The printer manager 4 will now specifically be explained.

Figures 4, 5:
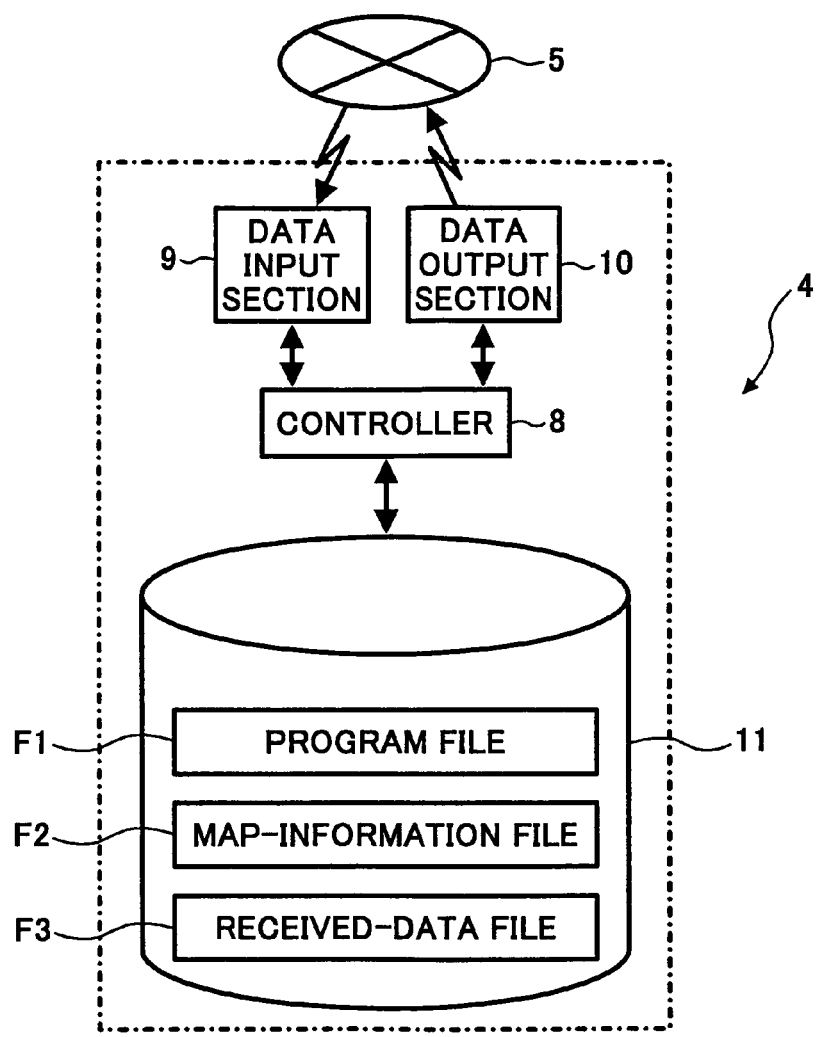
FIG. 4 is a diagram exemplarily showing the structure of a printer manager included in the printing system of FIG. 1.
FIG. 5 is a diagram exemplarily showing data stored in a map-information file managed in the printer manager of FIG. 4.

FIG. 4 is a block diagram schematically showing the structure of the printer manager 4. As shown in FIG. 4, the printer manager 4 has a controller 8 including a CPU, a ROM, a RAM, etc. This controller 8 controls each section of the printer manager 4, and carries out various processes for transferring data, performing calculations, temporarily storing data, and the like. This controller 8 is connected to a data input section 9 for inputting data sent from the workstations 3, a data output section 10 for output data to the printer devices 2 and an HDD (Hard Disk Drive) 11 serving as a memory unit.

The HDD 11 of the printer manage 4 stores a program file F1, a map-information file F2 as a map database and a received-data file F3.

The program file F1 stores a control program. This control program is to control the controller 8 to execute a predetermined operational process. The control program includes: for example, a program for receiving data sent from the workstations 3; a program for finding out a store, that has a printer device 2 and is located in a place preferably corresponding to the travelling route of the user based on data sent from a corresponding workstation 3; a program for sending data to a user-selected printer device 2; and a program for checking whether the printing of the printer device 2 has adequately been completed.

The map-information file F2 includes, in a database format, location-information (position information) items 20 each representing a store (e.g. a convenience store, etc.) where a printer device 2 is located, address-information items 21 each representing an address of the store, additional-information items 22 each representing whether the printer device 2 is a color printer, whether the store is open for twenty four hours, or whether the store has a parking space, etc., and image-data items 23 each representing a map showing the printer device 2. This map-information file F2 may further include a wide range of map data indicating each corresponding printer device 2.

The received-data file F3 includes document data received from the workstations 3.

The printer manager 4 need not store the map-information file F2, and may use any external map database. For example, the information (except the map data) representing the location of the printer device 2 may be stored in a memory unit, such as the HDD 11, etc., so that the printer manager 4 accesses and searches an external database storing the map data. Alternatively, the printer manager 4 may access and search an external database having the same information as that included in the map-information file F2.

Operations of the printing system according to the embodiment of the present invention will now be explained.

If one of the workstations 3 accesses the printer manager 4, the controller 8 detects this accessing through the data input section 9. Then, the controller 8 carries out a process for controlling this workstation 3, in accordance with the control program stored in the program file F1.

FIG. 6 is a front view showing the contents of a display page to be displayed on the display device 6 of the workstation 3 having accessed the printer manager 4. As shown in FIG. 6, the display device 6 of the workstation 3 having accessed the printer manager 4 displays an information-input page A for accepting various information input through the input device 7 of the keyboard, etc. The information (printing-condition information) to be input in this information-input page A includes information items respectively representing: the place of departure; the destination where predetermined documents are used; the means of transportation to the destination; a check-box for asking whether the user wants to know a plurality of stores as the search result; a check-box for asking whether the user wants to know the corresponding store(s) that is(are) located by a predetermined highway; a check-box for asking whether the user wants to know only those twenty-four-hour open stores; a check-box for asking whether the user wants a color printer; a box for indicating the direction in which a corresponding store is located; a box for asking whether the user wants a store with a parking space; and user information (user name, phone number, e-mail, ID No., etc.). Such information are sent from the workstations 3 to the printer manager 4, upon operation of a search-button B included in the information-input page A, and hence realizing a function for sending printing-condition information.

A print process, to be carried out based on various information thus input in the information-input page A, will now schematically be described with reference to FIG. 7.

The user creates a predetermined document using the workstation 3. Then, the user sends, to the printer manager 4, various information (printing-condition information) representing the destination where the created document is used, the place of departure, the means of transportation. Upon reception of the printing-condition information, the printer manager 4 searches the map-information file F2 based on the received printing-condition information, and searches for information (information representing the located place of the printer device 2) representing one or more conveniently-located stores providing printing services.

Specifically, the printer manager 4 specifies the route from the place of departure to the destination. Then, the printer manager 4 extracts one or more stores corresponding to the user-specified conditions (e.g. opens twenty four hours a day, etc.), of a plurality of printing-service providing stores along the specified route to the destination. Upon this, the printer manager 4 sends the search result representing the extracted information to the workstation 3 used by the user.

After this, in the case where the user selects one store from the searched result displayed by the workstation 3, the workstation 3 sends store-information representing the selected store, the user information and the document data to the printer manager 4. The printer manager 4 sends the user information and the document data to the printer device 2 installed in the user-specified store, and requests the printer device 2 to print the sent information. In the case where a suitable store can not be found, the workstation 3 sends cancellation information to the printer manager 4, in accordance with user operations. The printer manager 4 monitors the printer device 2 to determine whether printing has adequately been performed by a predetermined printer device 2. After this, the printer manager 4 sends the monitoring result to the workstation 3 used by the user.

Figure 8:
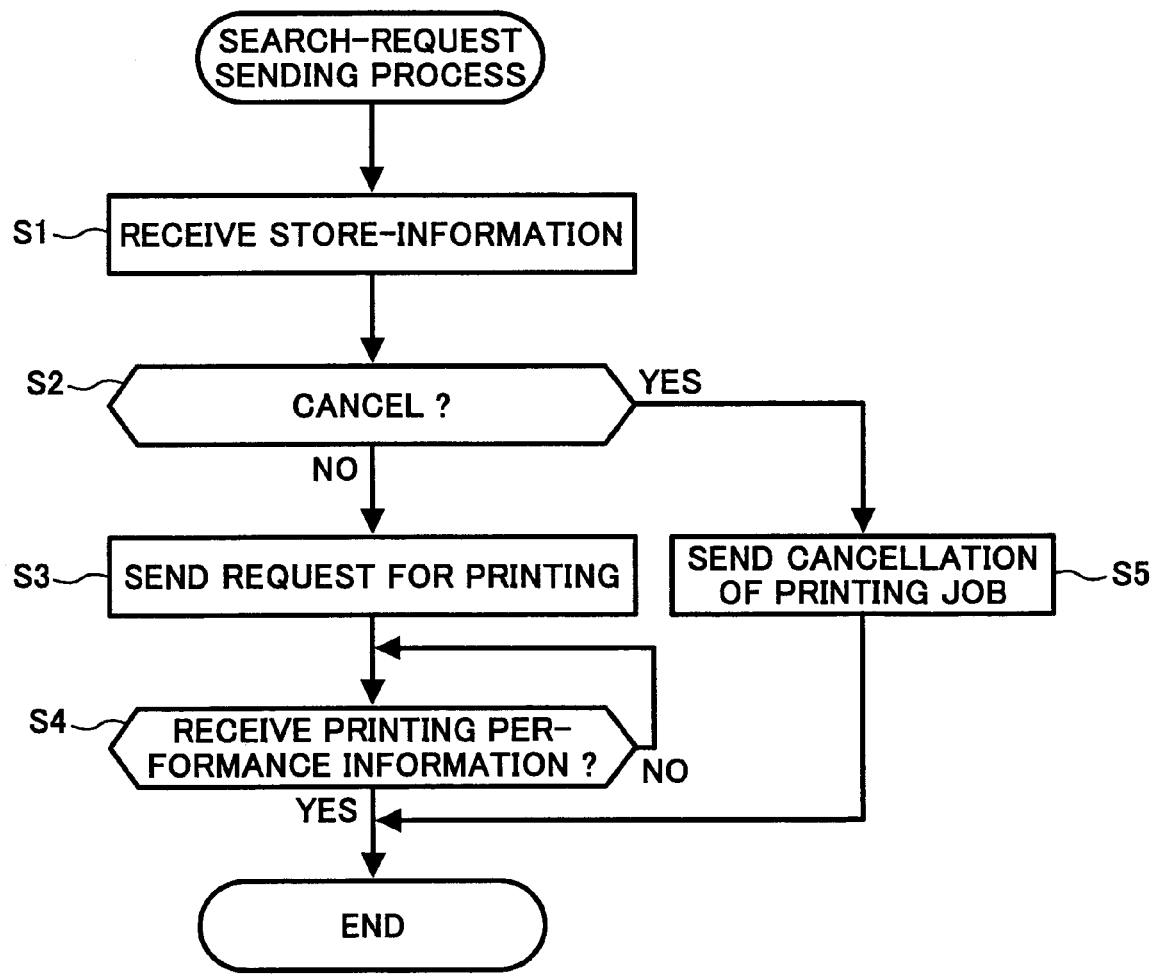
FIG. 8 is a flowchart for explaining a search-request sending process executed by the workstation in the print process of FIG. 7.

Explanations will now be made to the procedures of the print process. A process for sending a search request, as will be executed by the workstation 3, will now be described with reference to the flowchart of FIG. 8. As shown in FIG. 8, the workstation 3, which has sent the above-described printing-condition information together with a search request, receives the information representing a conveniently-located printing-service providing store along the route to the destination, and displays the received information thereon (Step S1), and hence realizing a function for sending the location information. Note that thus received information is that searched out by the printer manager 4 based on the printing-condition information.

Now, the user decides whether to use the store searched by the printer manager 4. In the case where the user decides to use the searched store and settles the store in accordance with the operation of the keyboard, etc. (Step S2: NO, Settlement of Printer), the workstation 3 sends information representing the user-decided store and document data to be printed using the printer device 2 installed in the store (Step S3). In the case where the information, which has been transmitted when requesting the search, does not include the user information, representing the user name, the user's phone number, etc., the workstation 3 sends the user information together with the search request in the step S3, and hence realizing a function for sending settled-printer information and a function for sending data to be printed.

Subsequently, in Step S4, the workstation 3 waits until information regarding the printing performance is sent. In the case where the workstation 3 receives the information regarding the printing performance (Step S4: YES), the process for sending the search request is terminated.

In the case where the user decides not to use the store searched by the printer manager 4 and inputs information regarding this decision (Step S2: YES), the workstation 3 informs the printer manager 4 about the cancellation of the printing job (Step S5), and the process for sending the search request is terminated.

A process for receiving a search request, as will be executed by the printer manager 4, will now be described with reference to the flowchart of FIG. 9.

Figure 9:
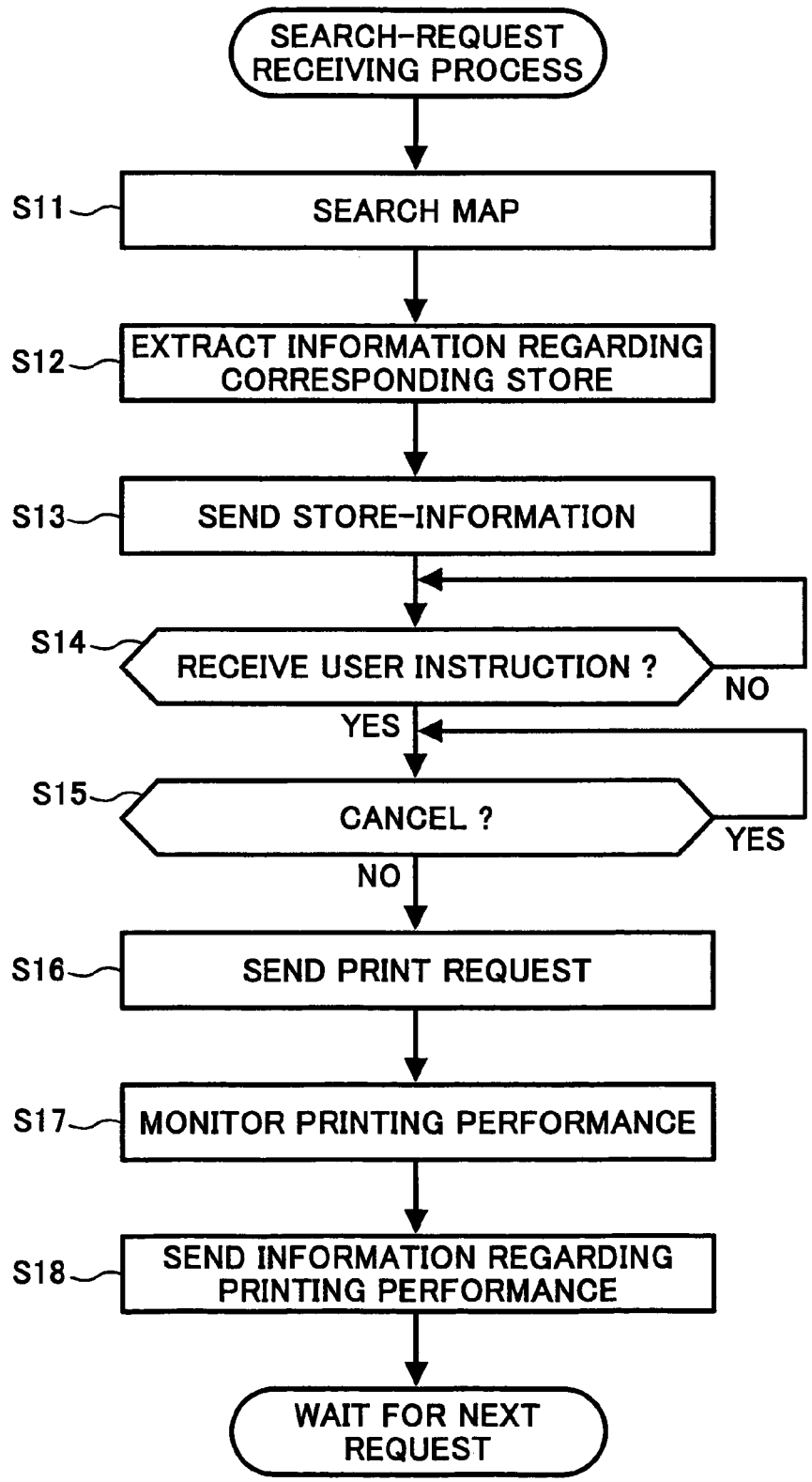
FIG. 9 is a flowchart for explaining a search-request receiving process executed by the printer manager in the print process of FIG. 7.

As shown in FIG. 9, the printer manager 4, which has received a search request including departure information, destination information, means of transportation, user information, etc., searches the map-information file F2 based on the received information in the step S11, and finds out the best route to the destination. In Step S12, the printer manager 4 searches for information (information regarding the location of the printer 2) representing one or more conveniently-located stores along or by the best route to the destination. In accordance with a user instruction or in an automatic manner, there is indicated a condition that the target store should relatively be near from the final destination in the case where the user gets the destination by foot or in the case where there are found a plurality of corresponding stores.

In addition, in accordance with a user instruction or in an automatic manner, there is indicated a condition that the target store should be located on the right-hand side in the forward direction of the user's route in the case where the user gets the destination by car. Note, in this case, that the user (the car driver) can easily get the target store on the way to the destination, while driving on the right-hand side of the road.

By this, the printer manager 4 can extract information (information regarding the location of the printer device 2) regarding the conveniently-located store which provides the printing services, and hence realizing a function for extracting printer-location information.

In more particular, let it be assumed that the user tries to get a point B from a point A indicating the user's company, in accordance with the information-input page displayed on the workstation 3. In this case, if some conditions such that the user takes a plane to the nearby airport and gets the point B by taxi, the printer manager 4 first searches for any printing-service providing stores along the route from the nearby airport to the point B. After this, the printer manager 4 may send store-information representing the searched store(s) along that route.

In the case where there is not found any corresponding store along that route, the printer manager 4 searches for any store(s) slightly beside the route, and sends information representing the searched store(s) to the user. In this case, if there are some user-requested conditions such that the user wants a store along a predetermined highway and the user wants a color printer, the printer manager 4 searches for any corresponding stores, based on the conditions.

In the case where the printer manager 4 receives such a condition from the user that the user gets the point B from the point A by car, the printer manager 4 finds out the most preferable route from the point A to the point B based on the condition. Subsequently, the printer manager 4 sends store-information representing one or more store(s) along the route, in response to a request from the user.

In the case where there is not found any corresponding store along the route, the printer manager 4 searches for any store(s) slightly beside the route, and sends information representing the searched store(s) to the user. Further, if there is a user-requested condition that a store must have a parking lot or located on the right-hand side in the forward direction of the user's route, the printer manager 4 performs the searching for a corresponding store based on the requested condition.

After this, the printer manager 4 sends the searched store-information to a predetermined workstation 3 (Step S13: location-information sending means). The printer manager 4 waits until transmission of information representing whether a print process will be executed at the searched store and/or a to-be-printed document, from the workstation 3, based on input operations of the user (Step S14). In this manner, determined-printer-information receiving means and printing-data receiving means are executed.

Upon reception of the information representing whether a print process will be executed at the searched store and/or the to-be-printed document (Step S14: YES), in the case where the information is a request for printing (Step S15: NO), the printer manager 4 transfers user information and the data representing the to-be-printed document to the printer device 2 installed in the finally-determined store (Step S16). In this case, the request for printing includes both of information representing a store that the user finally determined to use and document data to be printed by the printer 2 installed in the finally-determined store. In this manner, means for transferring the to-be-printed data is executed.

In the case where to show a point ad, such as the store name, the store logo, etc. in the header or footer section of the to-be-printed document, the printer manager 4 reads out ad information which is registered in advance in the HDD 11 as a memory unit of the printer manager 4. Subsequently, the printer manager 4 sends the read ad information to the printer device 2. Note that this ad information is an ad part, representing the store name, the store logo, etc. of the printing-service providing store, and is ad data regarding the installed place of the printer device 2.

After the transferring of data representing the to-be-printed document, the printer manager 4 monitors the printer device 2 to determine whether printing has appropriately been performed by a predetermined printer device 2 (Step S17). The printer manager 4 sends a result of the determination to the workstation 3 used by the user (Step S18). The printer manager 4 waits until transmission of a following search request. In this manner, means for obtaining the present status of the printer device 2 can be executed. In the case where a problem, such as an error in printing, etc., occurs, it is possible to deal with the error. For example, in this case, the printer manager 4 may send an error message to the workstation 3. This monitoring process includes various processes which are generally employed in conventional network printing systems. Those processes include: a process for acquiring the state of the printer device 2 by inquiring the printer device 2 about the present status thereof at predetermined timing intervals; a process for determining the status of the printer device 2 by awaiting for a print-completion signal from the printer device 2 for a predetermined period of time.

In the case where the information sent from the workstation 3 is a request for stopping the printing (Step S15: YES), the printer manager 4 terminates this search-request receiving process, and waits until transmission of a next search request.

Figure 10:
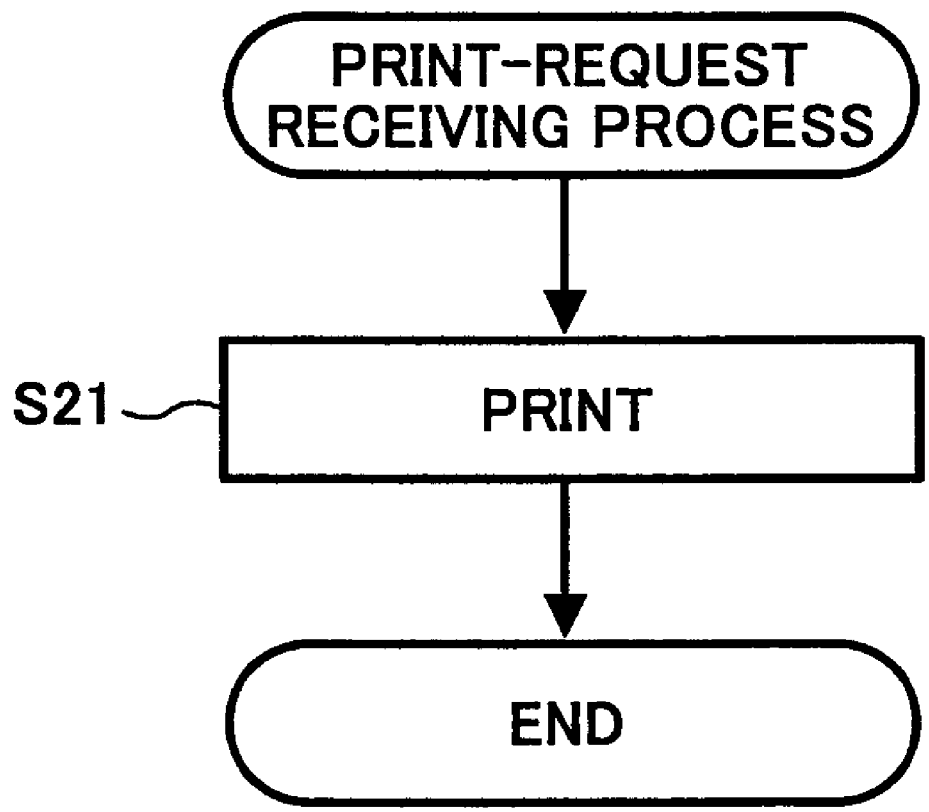
FIG. 10 is a flowchart for explaining a print-request receiving process of the printer device in the print process of FIG. 7.

Explanations will now be made to the print-request receiving process executed by the printer device 2, with reference to the flowchart of FIG. 10. As shown in FIG. 10, upon reception of a print request including the user information and to-be-printed document, the printer device 2 carries out a printing process based on the received information (Step S21). After the printing, the information terminal installed in the store receives completion information regarding the printing done by the printer device 2, and outputs a completion message, etc. so that the staff of the store can be aware that the printing of the document has been executed. The printer device 2 itself may output the completion message.

The print request may include ad information, which is an ad part including the store name or logo of the printing-service providing store and is ad data regarding the installed place of the printer device 2. In this case, the ad part, such as the store name or logo of the printing-service providing store is printed in the header or footer section. In this manner, means for printing an ad is partially executed. By this, the printing-service providing store can advertise itself not only to the user of the store through the above-described printing service itself, but also to any other people through the usage of the printed documents that might have been given from the user. For example, a lecturer is going to give a lecture in front of a large number of listeners at university and prepares lecture notes for the listeners using a printer device 2 installed in a store located near the university. In this case, the store name is written in the header section of the printed matter as advertisement data, and hence advertising the store. In this way, if the lecturer puts the store's ad on the lecture notes, the store gives some service to the lecturer for the ad.

In addition, the user information included in the print request may be printed in the header or footer section of the printed matter, and thus identifying the documents output by a plurality of users.

According to the above-described printing system, users can go out without bringing some documents with them. The printing system 1 searches for a store which is conveniently located along the route to the destination, and can surely output documents using the printer device 2 installed in the conveniently-located store. By setting various conditions during the searching, a result of the searching can flexibly be obtained.

In particular, in the case where a sales staff visits his/her customer by air, the sales staff may want to get necessary documents for a business before boarding an airplane and review the documents in the plane. In this case, the printing system 1 searches for a store located at the airport, so that data of the to-be-printed document can be transferred to the printer device 2 installed in the searched store so as to be output therefrom. Further, in the case where the sales staff stays at a hotel located close to the nearby airport on the night before the sales staff has a meeting with the customer, the printing system 1 searches for a store near the hotel, transfers and outputs the printing data to the printer device 2 installed in the searched store.

In the case where an urgent meeting will be held, the sales staff may use a twenty-four-hour open store, so that some necessary documents can be output from a printer device 2 of the store. In this structure, the sales staff can take his/her time to prepare the documents for the meeting, without paying special attention to time.

The user may specify the time for printing the documents. In this case, for example, the workstation 3 accepts the input of the printing time, and sends the accepted input together with an instruction for printing documents, to the printer manager 4. Upon reception of the input and the printing instruction, the printer manager 4 temporarily stores the received information in the memory unit, and sends a print request to the specified printer device 2 based on the set printing time.

The document to be printed may be created by any computer other than the workstation 3. In this case, the user operates the workstation 3 to read out the document from a recording medium recording the document and to send the read document to the printer manager 4.

The information terminal used by the user for data communications with the printer manager 4 is not limited to the above-described workstation 3, and may include various information terminals, such as a general personal computer, a portable terminal, and any other terminals having a communications function.

In the case where a point ad, including the store name or store logo, etc. is inserted in the header or footer section of the to-be-printed document, the printer device 2 may reads out the information stored in advance in the recorder 222 of the printer device 2, and print the read information in the header or footer section of the document.

The system of the present invention can be realized by a general computer, without the need for a dedicated system. A program and data for controlling a computer to execute the above-described processes may be recorded on a medium (a floppy disk, CD-ROM, DVD or the like) and distributed, and the program may be installed into the computer and run on an OS (Operating System) to execute the above-described processes, thereby achieving the system of the present invention. The above program and data may be stored in a disk device or the like in the server device on the Internet, and embedded in a carrier wave. The program and data embedded in the carrier wave may be downloaded into the computer so as to realize the system of the present invention.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-200473 filed on Jul. 2, 2001, and including specification, claims, drawings and summary. The disclosure of the above Japanese Patent Application is incorporated herein by reference in its entirety.

What is claimed is:

1. A server computer which is connectable to at least one information terminal and a plurality of printer devices through a communications network, said computer comprising:

a database which stores location information regarding a location in which each of said plurality of printer devices is installed;

a condition-information receiver which receives printing-condition information including designated departure address, destination address and transportation information associated with multiple transportation modes or sequences of transportation modes available for use by a user, entered by the user into a dynamic address field, given by said condition-information receiver to said at least one information terminal;

a search unit which specifies a route based on the departure address, the destination address and the multiple transportation modes in the received printing-condition information, and searches said database to extract the location information of one or more printer devices along the specified route;

a location-information sender which sends the location information regarding the location of said one or more printer devices, to said at least one information terminal;

a document-data receiver which receives printer information regarding a user-selected printer device, that a user has selected from said one or more printer devices based on the location information, and document data to be printed; and a document-data sender which sends the document data to said user-selected printer device.

2. The server computer according to claim 1, wherein the printing-condition information further includes location-request information, regarding a preferred location for a printer device that the user prefers.

3. The server computer according to claim 1, wherein:

the location information further includes function information regarding a function of each of said plurality of printer devices; and the printing-condition information further includes function-request information regarding a preferred function for a printer device that the user prefers.

4. The server computer according to claim 1, further comprising a monitor which acquires status information representing status of said user-selected printer device to which the document data has been sent, and carries out a predetermined error process in a case where an error occurs in said user-selected printer device.

5. The server computer according to claim 1, further comprising:

an advertisement-data storage unit which stores advertisement data regarding the location information of each of said plurality of printer devices; and an advertisement-data reader which reads out the advertisement data corresponding to said user-selected printer device from said advertisement-data storage unit, and wherein said document-data sender affixes the read advertisement data to the document data, and sends the document data having the advertisement data affixed thereto to said user-selected printer device.

6. An information terminal which is connectable to a server computer having a database storing location information regarding a location of each of a plurality of printer devices, through a communications network, said terminal comprising:

a printing-condition information input unit which accepts printing-condition information including designated departure address, destination address and transportation information associated with multiple transportation modes or sequences of transportation modes available for use by a user, entered by the user into a dynamic address given by said server computer;

a data sender which sends the printing-condition information to said server computer;

a data receiver which receives location information regarding a location of one or more printer devices, along a route specified by said server computer based on the departure address, the destination address and the multiple transportation modes;

a printer-selection accepting unit which outputs the received location information, and accepts selection information representing a user-selected printer device that a user has selected from said one or more printer device; and a sender which sends printer information representing said user-selected printer device and document data to be printed, to said server computer.

7. A printing system including a server computer and a plurality of printer devices which are all connectable to each other through a communications network, and wherein said server computer:

stores location information regarding a location of each of said plurality of printer devices, in a database;

receives printing-condition information including designated departure address, destination address and transportation information associated with multiple transportation modes or sequences of transportation modes available for use by a user, entered by the user into a dynamic address field given by said server computer from at least one information terminal;

specifies a route of the user based on the departure address, the destination address and the multiple transportation modes;

searches said database to extract location information regarding a location of one or more printer devices along the specified route;

sends the extracted location information to said at least one information terminal; receives printer information representing a user-selected printer device, that a user has selected from said one or more printer devices, and document data to be printed, from said at least one information terminal; and sends the document data to the user-selected printer device, and said user-selected printer device receives the document data from said server computer, and prints the received document data.

8. The printing system according to claim 7, wherein said user-selected printer device acquires advertisement data regarding a location thereof, and prints the advertisement data in a header section or a footer section of the document data received from said server computer.

9. The printing system according to claim 7, wherein said server computer acquires status information representing status of the user-selected printer device to which the document data has been sent, and carries out a predetermined error process in a case where an error occurs in the user-selected printer device.

10. A method of remotely printing predetermined data to be printed, comprising the steps of:

preparing a database storing location information regarding a location of each of a plurality of printer devices;

sending printing-condition information including designated departure address, destination address and transportation information associated with multiple transportation modes or sequences of transportation modes available for use by a user entered by the user into a dynamic address field from a user terminal, to a server computer;

specifying a route based on the departure address, the destination address and the multiple transportation modes by said server computer;

searching said database to extract location information regarding a location of one or more printer devices along the specified route by said server computer;

sending the extracted location information to said user terminal from said server computer;

outputting the location information regarding the location of said one or more printer devices, in said user terminal, and accepting document data to be printed and selection information representing a user-selected printer device, that a user has selected from said one or more printer devices specified in the location information;

sending printer information regarding the user-selected printer device and document data to be printed to said server computer; and sending the document data to the user-selected printer device selected by the user in said server computer.

11. The method according to claim 10, wherein a part or all of said plurality of printer devices are installed in convenience stores, respectively.

12. A method of remotely printing predetermined data to be printed, comprising the steps of:

acquiring printing-condition information including designated departure address and destination address and transportation information associated with multiple transportation modes or sequences of transportation modes available for use by a user, entered by the user into a dynamic address field;

specifying a user's route based on the departure address, the destination address and the multiple transportation modes in the printing-condition information;

searching a database, storing location information regarding a location of each of a plurality of printer devices to extract location information regarding a location of one or more printer devices along the specified route;

supplying the user with the extracted location information;

accepting selection information representing a user-selected printer device, that the user has selected from said one or more printer devices specified in the supplied location information;

acquiring printer information regarding the user-selected printer device and document data to be printed; and sending the document data to the user-selected printer device selected by the user.

13. A computer readable recording medium which records a program for controlling a server computer, which is connectable to at least one information terminal and a plurality of printer devices through a communications network, to serve as:

a condition-information receiver which receives printing-condition information including designated departure address, destination address and transportation information associated with multiple transportation modes or sequences of transportation modes available for use by a user, entered by the user into a dynamic address field given by said server computer to said at least one information terminal;

a search unit which specifies a route based on the departure address, the destination address and the multiple transportation modes, and searches a database storing location information regarding an installation location of each of said plurality of printer devices to extract the location information regarding a location of one or more printer devices along the specified route;

a location-information sender which sends the location information regarding the location of said one or more printer devices, to said at least one information terminal;

a document-data receiver which receives printer information regarding a user-selected printer device, that a user has selected from said one or more printer devices based on the location information, and document data to be printed; and a document-data sender which sends the document data to said user-selected printer device.

* * * * *